(12) United States Patent
Nadeau et al.

(10) Patent No.: US 11,130,265 B2
(45) Date of Patent: Sep. 28, 2021

(54) APPARATUS AND METHOD FOR INJECTION MOLDING ENCAPSULATION

(71) Applicant: MI INTEGRATION S.E.N.C., Sherbrooke (CA)

(72) Inventors: Nicolas Nadeau, Sherbrooke (CA); Jean Therrien, Sherbrooke (CA); Yves Martin, Sherbrooke (CA)

(73) Assignee: M.I. INTEGRATION S.E.N.C., Quebec (CA)

( * ) Notice: Subject to any disclaimer, the term of this patent is extended or adjusted under 35 U.S.C. 154(b) by 236 days.

(21) Appl. No.: 16/465,655

(22) PCT Filed: Dec. 1, 2017

(86) PCT No.: PCT/CA2017/051447
§ 371 (c)(1),
(2) Date: May 31, 2019

(87) PCT Pub. No.: WO2018/098586
PCT Pub. Date: Jun. 7, 2018

(65) Prior Publication Data
US 2020/0023561 A1    Jan. 23, 2020

Related U.S. Application Data

(60) Provisional application No. 62/429,175, filed on Dec. 2, 2016.

(51) Int. Cl.
*B29C 45/14* (2006.01)
*B29K 709/08* (2006.01)

(52) U.S. Cl.
CPC .. *B29C 45/14434* (2013.01); *B29C 45/14836* (2013.01); *B29C 2045/14844* (2013.01); *B29K 2709/08* (2013.01)

(58) Field of Classification Search
None
See application file for complete search history.

(56) References Cited

U.S. PATENT DOCUMENTS 2,559,861 A * 7/1951 Fay .................. B29C 45/14065
425/125
4,543,283 A    9/1985 Curtze et al.
(Continued)

FOREIGN PATENT DOCUMENTS

CN    101279499 A    10/2008
CN    202895600 U    4/2013
(Continued)

OTHER PUBLICATIONS

English language Abstract of DE10 2006 016173A1.
(Continued)

*Primary Examiner* — Edmund H Lee
(74) *Attorney, Agent, or Firm* — Ware, Fressola, Maguire & Barber LLP

(57) ABSTRACT

An injection mold for encapsulating a substrate comprises a lower mold component and an upper mold component adapted to form an encapsulation mold at an edge of the substrate when the upper mold component engages the lower mold component. The lower mold component comprises a substrate support and wherein the upper mold component comprises a recess. The injection mold includes a tiltable insert sized and shaped to slide within the recess to form a seal for the encapsulation mold, the insert having a substrate-contacting surface defining an area of the substrate contacted by the insert. The injection mold includes a plurality of pressure-exerting actuators connected to the tiltable insert and each being configured to independently apply pressure on the substrate via the insert, wherein the plurality of pressure-exerting actuators are adapted to equili- (Continued)

brate a total predetermined pressure exerted by the insert substantially evenly across the area of the substrate-contacting surface.

20 Claims, 9 Drawing Sheets

(56) References Cited

U.S. PATENT DOCUMENTS

| | | | |
|---|---|---|---|
| 5,068,076 A | 11/1991 | Weaver et al. | |
| 6,335,221 B1 | 1/2002 | Mess | |
| 6,754,971 B1 * | 6/2004 | Hagenmeyer | B29C 44/58 33/520 |
| 9,023,267 B2 | 5/2015 | Haupt et al. | |
| 2008/0031991 A1 | 2/2008 | Choi et al. | |

FOREIGN PATENT DOCUMENTS

| | | |
|---|---|---|
| CN | 203527791 U | 4/2014 |
| DE | 10 2006 016173 A1 | 10/2007 |
| DE | 102011050479 A1 | 11/2012 |
| EP | 0749819 * | 12/1996 |
| EP | 1 220 309 A1 | 7/2002 |
| EP | 2 801 466 A1 | 11/2014 |
| JP | 62251113 A | 10/1987 |
| JP | 6958505 B2 | 3/2016 |
| WO | 2010/083027 A1 | 7/2010 |

OTHER PUBLICATIONS

English language Abstract of CN 202895600U.
English language Abstract of DE 102011050479A1.
English language Abstract of CN 203527791U.
English language Abstract of CN 101279499A.
English language Abstract of JPS62251113A.
English language Abstract of JP5958505B2.

* cited by examiner

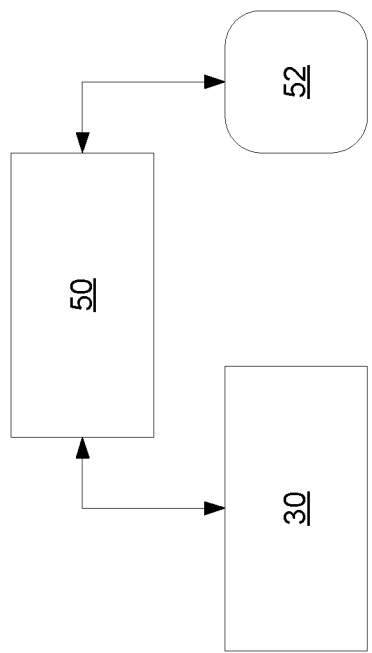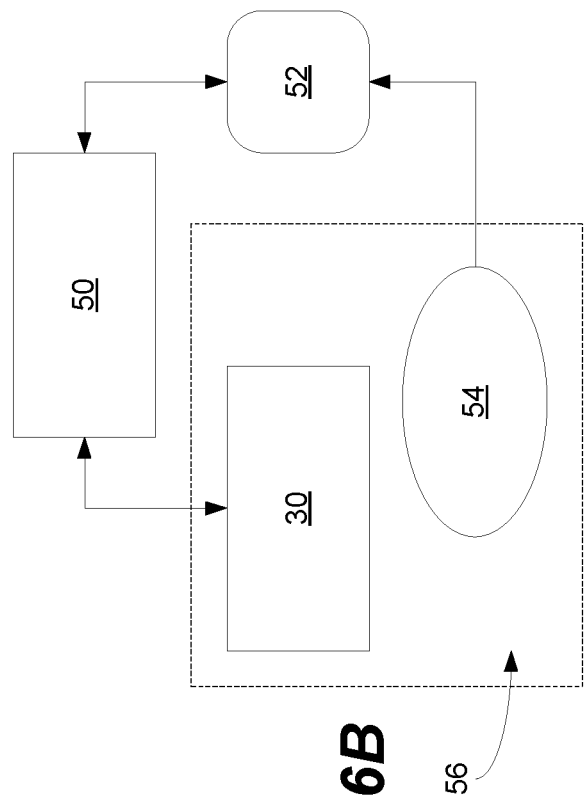

US 11,130,265 B2

APPARATUS AND METHOD FOR INJECTION MOLDING ENCAPSULATION

TECHNICAL FIELD

This invention relates generally to injection molding encapsulation and, more specifically, to apparatuses and methods for encapsulation of glass panels by injection molding.

BACKGROUND

Materials such as thermoplastics, thermosets, elastomers and thermoplastic elastomers (TPE) are often molded onto the edge of substrates such as glass panels, for example, to form a functional structure adapted to be assembled on a frame such as a frame of a vehicle. The application of these materials to the edge of a substrate by injection molding is referred to as encapsulation. The manufacturing specifications for certain types of consumer products such as automobiles are very strict with high standards for precision and reproducibility. These requirements present several challenges for the optimization of the encapsulation process by injection molding.

The encapsulation process requires that the substrate be positioned within an injection mold generally comprising two parts each having cavities that form a mold cavity when the two parts are brought together to "sandwich" the substrate. The substrate is subjected to very high pressures in order to form a proper seal for the encapsulation cavity within the mold and to prevent the displacement of the substrate during injection to minimize any distortion or "flash" (spilling of the thermoplastic outside the mold encapsulating the edge of the substrate and onto the rest of the substrate). Because of the high pressures involved any local defect in non-resilient substrates, such as a bump or small deformation, is enough to induce local pressures that can result in damage to the substrate. For example, when the substrate is a glass panel, such defects may result in the shattering or cracking of the glass panel when the pressure is applied.

Furthermore, given the requirement for extremely precise fitting of the various parts of the mold and of the substrate within the mold, even small variations in the average thickness of the substrate from batch to batch require time-consuming adjustments.

In addition, the encapsulation design sometimes requires an asymmetrical mold with respect to the two sides of the edge of a substrate requiring complex mold designs and, accordingly, complex pressure distribution over the substrate.

The prior art teaches certain solutions to these problems and challenges. For example, U.S. Patent Application Publication 2008/0031991 (Choi et al.) discloses an injection mold for glass encapsulation that seeks to address the issue of glass breakage at the edge of the encapsulation mold cavity. Choi et al. discloses shock absorbing units in the lower mold that are connected to a support unit which supports the lower portion of the glass panel. The support unit moves up and down along a support recess defined in the lower mold. The pressure in the glass panel is passively distributed by the shock absorbing units when the upper mold is lowered into engagement with the lower mold. The mechanism, however, is believed to exhibit certain technical shortcomings that make it difficult to achieve a perfect encapsulation of a glass panel. Firstly, the support unit is vertically slidable relative to the lower mold which means that the support unit is not an immobilized structure which makes it difficult to very precisely align the glass panel on the support unit. Secondly, the support unit is coupled by two parallel guides to the lower mold which limit how much the support member may tilt sideways. Thirdly, in the event of glass breaking, the glass debris falls downwardly into the interstices between the support unit and the lower mold, potentially damaging the mechanism. Fourthly, when the upper mold is clamped into engagement with the lower mold, the upper mold exerts the same force on the glass panel as it exerts on the lower mold when the shock absorbing are locked or bottomed out. Thus, if the shock absorbing units are locked or bottomed out, the upper mold may exert too much pressure on the glass panel when clamped to the lower mold. Fifthly, even with the shock absorbing units, the upper mold has two downward protrusions that contact the upper face of the glass panel, thus creating localized stresses at the two contact points.

U.S. Pat. No. 6,335,221 (Mess) discloses a biased floating plate to apply sealing pressure on a substrate and to compensate for variations in the thickness of the substrate. However, the mechanism is such that the floating plate applies the pressure on the substrate indirectly and therefore cannot compensate for small defects in the substrate.

Japanese Patent 62-251113 discloses an encapsulation mold with a hydraulic mechanism that presses on the insert. Although there is a small gap between the insert and the mold, the gap provides only vertical adjustability, and thus the mechanism cannot tilt to compensate for small defects of variation in thickness in the substrate.

The prior-art solutions described above do not fully and adequately address the technical problems identified above. As a result, when the prior-art techniques are used for encapsulation, there remains a significant risk of breaking the substrate, particularly when the substrate is a frangible material such as glass. There remains a need in the injection molding art for a method and apparatus that addresses the shortcomings of the prior art so that debris or particles in the mold that remain from prior breakage of substrates or imperfections in the substrate do not damage or break substrates during the injection molding process. There is therefore a need for an improved injection mold for substrate encapsulation.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

One aspect of the invention is an injection mold for encapsulating a substrate. The injection mold includes a lower mold component, an upper mold component adapted to form an encapsulation mold cavity at an edge of the substrate when the upper mold component engages the lower mold component. The lower mold component comprises a substrate support and wherein the upper mold component comprises a recess. The injection mold includes a tiltable insert sized and shaped to slide within the recess and having a substrate-contacting surface defining an area of the substrate contacted by the insert, the insert adapted to tilt within the recess relative to the upper and lower mold components to tiltably cooperate with the upper mold component to form a seal for the encapsulation mold cavity. The injection mold includes a plurality of pressure-exerting actuators each comprising a pressure coupling member to contact the insert and each actuator being configured to independently apply pressure on the substrate via the insert. The plurality of pressure-exerting actuators are adapted to equilibrate a total predetermined pressure exerted by the insert substantially evenly across the area of the substrate-contacting surface in response to local variations in thickness of the substrate thereby providing a tilting positional adjustment of the insert to compensate the variations.

Another aspect of the invention is a method of encapsulating a substrate. The method entails positioning the substrate on a support defined by a lower mold component within an injection mold, closing the mold by bringing an upper mold component into engagement with the lower mold component to form an encapsulation mold cavity around an edge of the substrate, and applying a predetermined total pressure on a predetermined area of the substrate with a tiltable insert using a plurality of pressure-exerting actuators to seal the encapsulation mold cavity and prevent displacement of the substrate during injection, wherein the tiltable insert comprises a lower portion having a sealing surface defining a compensation space with a recess wall, said sealing surface having a height such that its top edge is displaced by a lateral distance equal to or less than the compensation space when the insert is tilted. The method entails automatically and dynamically adjusting the pressure applied by each of the pressure-exerting actuators on the substrate via the insert as a function of a thickness of the substrate thereby causing the tiltable insert to tilt slightly relative to the upper and lower mold components in response to local pressure resistance buildup as a result of an imperfection in the substrate until the predetermined total pressure is distributed substantially evenly across the predetermined area. The method further includes injecting an encapsulation material into the encapsulation mold cavity and releasing the substrate.

Other aspects of the invention may become apparent from the detailed description and drawings.

BRIEF DESCRIPTION OF THE DRAWINGS

The invention will be better understood by way of the following detailed description of embodiments of the invention with reference to the appended drawings, in which:

FIG. 6A is a schematic depiction of a pressure control system for controlling the pressure-exerting actuators.

FIG. 6B is a schematic depiction of a pressure control system for controlling the pressure-exerting actuators and further including pressure sensors.

It will be noted that throughout the appended drawings, like features are identified by like reference numerals. The drawings are not to scale.

DETAILED DESCRIPTION

Disclosed herein is a novel injection mold for encapsulating a substrate. The substrate can be any suitable substrate that is compatible with the process and conditions of injection molding and can include without being limited to glass, metals, plastics, ceramics and composite materials.

Figure 1:
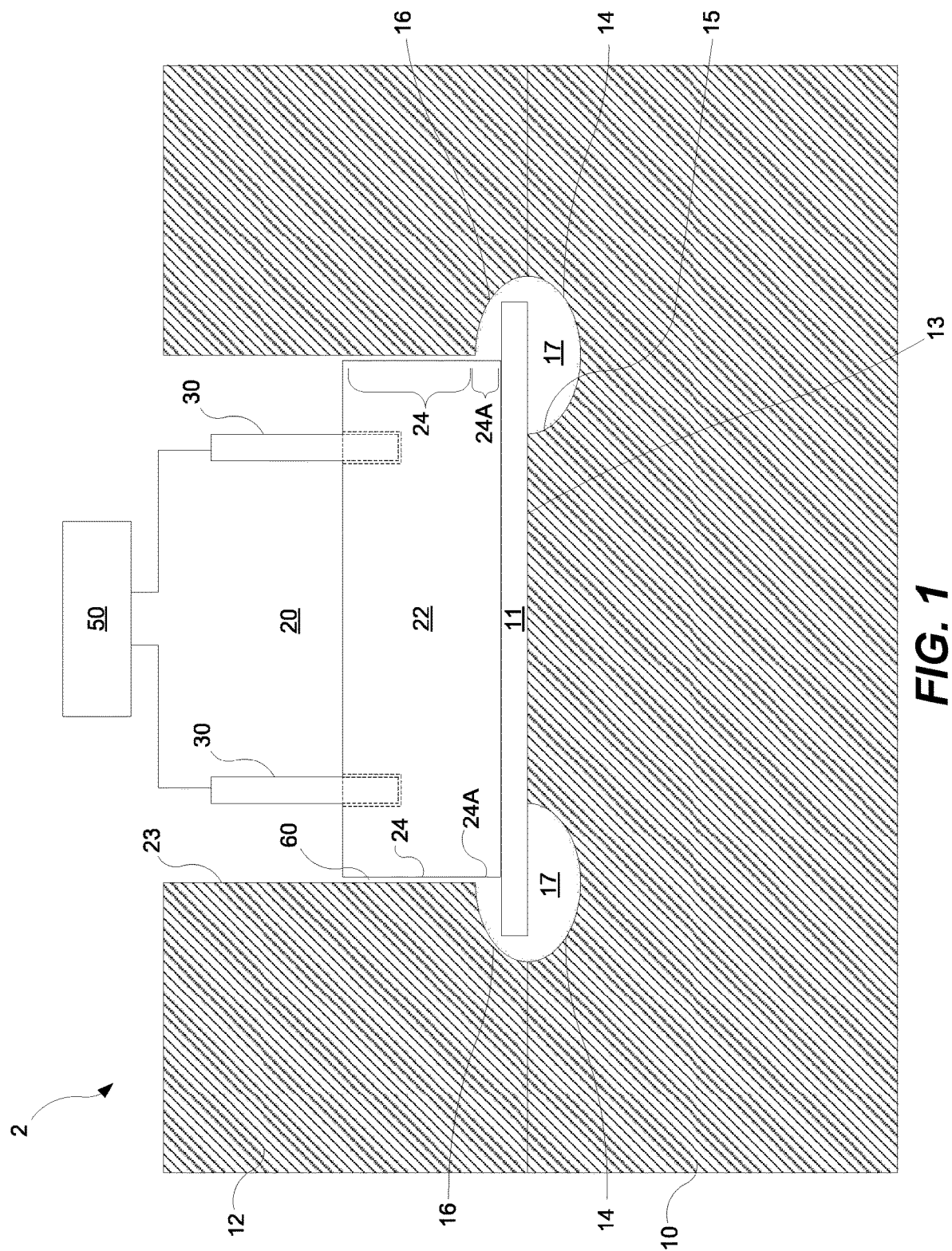
FIG. 1 is a cross-sectional view of an injection mold having a substrate-contacting insert and pressure-exerting actuators in accordance with an embodiment of the invention.

In the embodiment depicted by way of example in FIG. 1, the injection mold 2 comprises a first mold member 10 (i.e. a lower mold component) for receiving a substrate 11 and a second mold member 12 (i.e. an upper mold component) adapted to cooperate with the first mold member 10 to form an encapsulation mold cavity 17 around a predetermined section or portion of the substrate 11 when the first and second mold members 10, 12 are joined together as shown schematically in cross-section in FIG. 1. The first and second mold members 10, 12 may be made of a metal alloy or any other suitable material. In one particular embodiment, the substrate 11 may be a glass panel such as a vehicle window, for example, a car windshield. The encapsulated material for vehicle windows such as a car windshield or a quarter window may be, for example, a thermoplastic such as Polyvinyl chloride polyvinyl chloride (PVC), a thermoplastic elastomer (TPE), or a synthetic rubber such as EPDM (ethylene propylene diene monomer). It will be appreciated that the molding method and injection mold disclosed herein may be used, or adapted for use, with other materials. The first mold member 10 comprises a substrate support 13 and a first member mold cavity 14. The substrate support 13 is designed to espouse the shape and contours of the section or portion of the substrate's surface with which it is in contact. The substrate support 13 can also be designed to form part of the first member mold cavity 14. Thus, as depicted in FIG. 1, the substrate support 13 may include an edge 15 which may be a curved or rounded edge of the first member mold cavity 14 on an underside of the substrate 11 or it may be a straight edge or a combination of different contours. The shape of edge 15 is thus not limited to curved or straight geometries but is dictated by the functionality of the encapsulation.

The second mold member 12 can likewise comprise a second member mold cavity 16 that cooperates with the first member mold cavity 14 of the first mold member 10 to form the encapsulation mold cavity 17 when the first and second mold members 10, 12 are joined together by a clamping mechanism. The clamping mechanism may comprise a hydraulically powered locking mechanism or any other interlocking structures as would be known to those skilled in the art of injection molding. It will be appreciated, however, that in certain applications it may be desirable to inject the molten plastic material (e.g. the melted thermoplastic) on a single side of the substrate 11. In such cases, either the first or the second mold cavity 14, 16 may be absent.

In the embodiment depicted in FIG. 1, the second mold member 12 (i.e. the upper mold component) further comprises a recess 20 adapted to receive a substrate-contacting insert 22 that serves to apply pressure on the substrate 11 and seal the encapsulation mold cavity and to prevent displacement of the substrate during injection of the molten material used for the encapsulation. The insert 22 comprises an outwardly facing side surface 24 which in turn comprises a subsection referred to as insert mold cavity sealing surface 24a. Furthermore, the insert 22, via the insert mold cavity sealing surface 24a, can also cooperate with the second member mold cavity 16 and the inwardly facing wall 23 of the recess 20 to define the encapsulation mold cavity 17 on a top side of the substrate 11 to seal the encapsulation mold when the insert 22 is positioned on the substrate 11 and the appropriate pressure is applied. The insert 22 also cooperates with the substrate support 13 to seal the cavity 14 by applying pressure on the substrate 11. Outwardly facing side surface 24 and wall 23 define a compensation space 60.

The insert 22 is mechanically coupled to pressure-exerting actuators 30, which may include hydraulically driven rods or shafts or discs which are, in turn, coupled to a pressure-generating system, the combination of which provides the necessary pressure to seal, clamp and maintain the substrate 11 in position during the injection of the encapsulating material into the encapsulation mold cavity 17.

The insert 22 is a tiltable insert shaped and sized to enable the insert to tilt relative to the substrate and recess 20. The tilting motion of the insert 22 allows a small amount of positional and/or angular adjustment in response to local variations and/or defects in the thickness of the substrate 11. In one aspect of the invention, the pressure control and the distribution of the pressure-exerting actuators 30 on the insert 22 enable the "absorption" or "compensation" of imperfections on the substrate 11. Thus, if a local defect in the substrate 11 is encountered while the insert 22 is lowered onto the substrate 11, a local pressure buildup will occur due to the local resistance caused by the defect or imperfection in the substrate. If nothing is done to compensate for the local pressure buildup, the insert 22 will continue to be lowered to exert its predetermined pressure. If continued unabated, the increase in pressure on the defect or thickness variation point (such as a bump) will very likely cause the substrate 11 to break, e.g. crack or even shatter in the case of glass. The injection mold 2 constructed in accordance with the embodiments of the present invention is designed to compensate the effect of a small localized defect in the substrate by individually controlling the pressures exerted by each of the pressure-exerting actuators 30 so that the amount of pressure exerted locally on an area of the substrate containing a defect is temporarily adjusted, reduced or at least not further increased to the predetermined level to thus avoid overstressing the substrate. Thus, the pressure applied by one or more of the pressure-exerting actuators 30 in the vicinity of the local pressure resistance buildup is reduced or adjusted while the other pressure-exerting actuators 30 keep applying pressure until the total, predetermined pressure equilibrates across the contact surface between substrate 11 and insert 22. As a result of the differential pressures exerted by the pressure actuators 30 during the positioning of the insert 22, the insert 22 may slightly tilt relative to the first and second mold members 10, 12 and the substrate 11 until a substantially identical pressure is applied to the remainder of the substrate 11. The insert 22 and the first and second mold members 10, 12 are designed to cooperate to maintain an adequate seal even when the insert 22 is tilted. In other words, the tilting of the insert 22 may result in the formation of a slight gap between the substrate 11 and the insert 22 at or near the insert mold cavity sealing surface 24a in some portion(s) of the encapsulation mold cavity 17. However, with the knowledge of the conditions of the injection process such as the viscous properties of the injected material (including the dynamics of the formation of the frozen layer of the flow thermosetting melt), temperature, flow velocity, etc. as well as the expected variations in the substrate dimensions (including expect magnitude of defects and thermal expansion) this gap would be small enough to still prevent the molten injected material from escaping the mold cavity 17. Thus, the gap should also be consistent with the sealing function of the insert when a mold cavity is present in the second mold member.

Thus, outwardly facing sealing side surface 24 interfaces in close proximity with the inwardly facing wall 23 to provide a narrow gap therebetween that is referred to herein as a compensation space 60 that allows the insert 22 to be displaced vertically and also provides leeway for the insert 22 to be tilted. The tilting motion of the insert 22 compensates for small local defects or thickness variations in the substrate 11.

The magnitude of the tilting is dictated by several factors. The width of the compensation space 60 and height of outwardly facing sealing side surface 24 are two such factors. In this respect, it will be appreciated that the displacement of the top of insert 22 towards or away from inwardly facing wall 23 increases as the height of outwardly facing sealing side surface 24 increases for a same defect compensating tilting. Therefore the height of outwardly facing sealing side surface 24 is dictated by the maximum tilt expected (maximum size of thickness defects) and the maximum width of compensation space 60 that is compatible with a seal that produces an encapsulation within the required specifications. It will also be appreciated that the magnitude of the tilting can be limited in part by the elastic integrity of the seal. Typically, because of stringent specifications with regards to the dimensions and quality of the encapsulation, the compensation space 60 is very small and the tilting is also small.

If the compensation space 60 is too large, a substantial quantity of the injected thermoplastic could infiltrate that space which would affect the shape of the encapsulation beyond the required specifications. Similarly, the magnitude of the tilting is also limited by the local gap created by the tilting between the substrate 11 and an underside of the insert 22. Such a gap, if too large, would lead to an undesirable infiltration of the thermoplastic otherwise known in the art as "flash". Despite these limitations, it has been surprisingly found that it is possible to allow for a certain amount of tilting and therefore adjustment to thickness variations in substrate 11. Therefore, the ability of the insert 22 to tilt when pressure is applied, as a result of its configuration, and pressure equilibration by the pressure-exerting actuators 30, avoids or at least significantly reduces the likelihood of, damage to, or breakage of, the substrate 11 while still preventing flash and distortion of the encapsulation.

Figure 2:
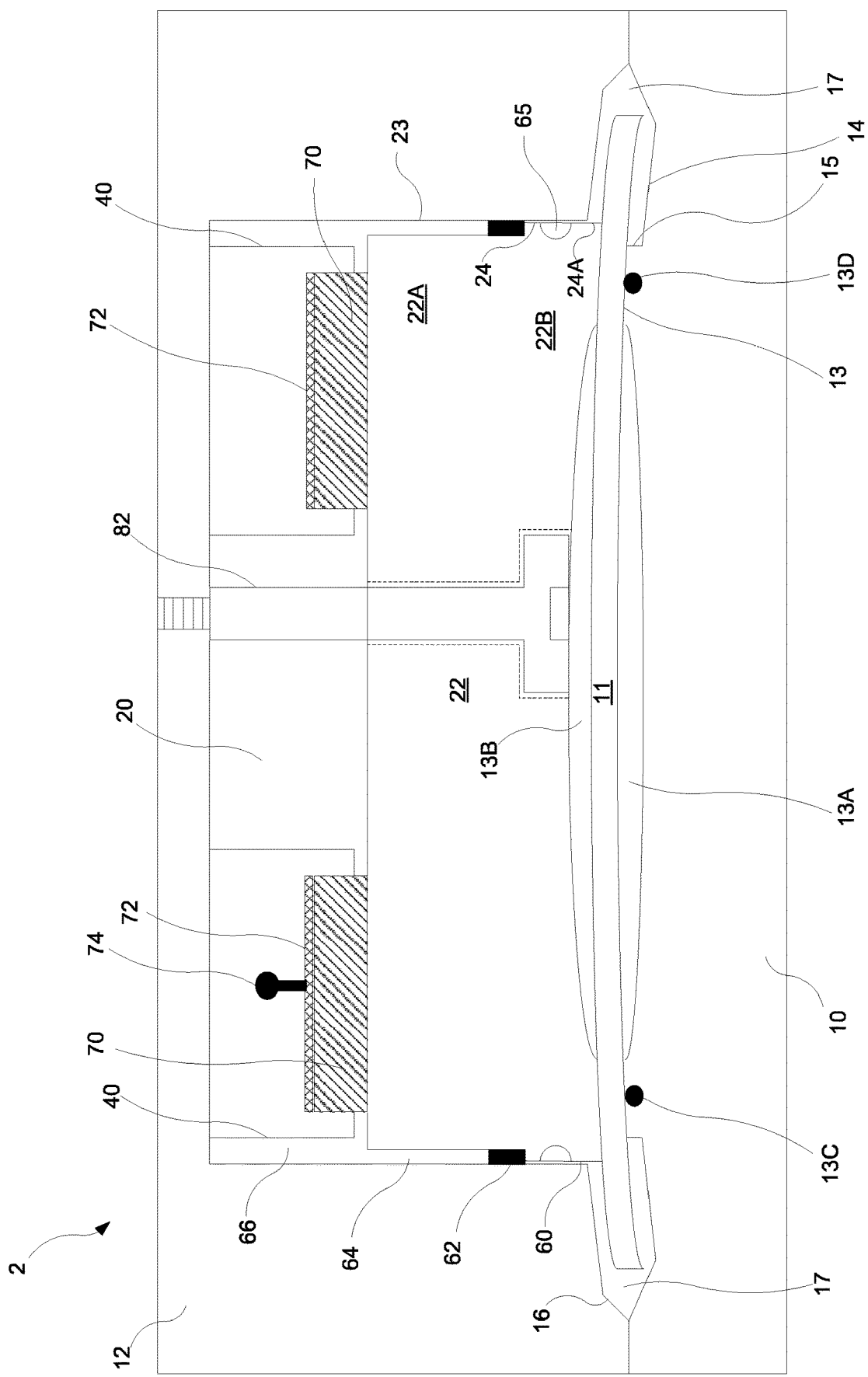
FIG. 2 is a cross-sectional view of an injection mold having a substrate-contacting insert and pressure-exerting actuators in accordance with another embodiment of the invention.

In embodiments where the height of outwardly facing sealing side surface 24 (i.e. thickness of insert) that is dictated by the required parameters to achieved the desired specifications is too small to sustain the pressure without being deformed and/or to accommodate the pressure-exerting actuators 30 and any other necessary or desirable parts of the injection mold, the insert 22 may be configured as illustrated in FIG. 2. The insert 22 can include an upper portion 22A and a lower portion 22B that is integral with the upper portion 22A. The upper portion 22A is narrower in width than the lower portion 22B thus defining a generally stepped structure for the insert 22, to accommodate the tilting. The lower portion 22B of the insert 22 includes the outwardly facing sealing side surface 24. Therefore, a gap 64 between the upper portion 22A and the wall 23 is created and is greater than the compensation space 60. The insert 22 is therefore configured so that the upper portion 22A is narrower so as to provide sufficient tilting maneuverability of the insert 22 in the upper portion 22A while providing additional structural support to withstand the pressure exerted by pressure actuators 30 and/or providing enough room to accommodate the pressure-exerting actuators 30 and any mold structural, positioning and/or coupling parts. By limiting the height of the outwardly facing sealing side surface 24 such that the lateral displacement of the upper edge of surface 24 is equal to or less than the compensation space 60 upon tilting of insert 22 and by limiting the width of the upper portion 22A of the insert 22, the gap 64 is sufficient to accommodate a lateral displacement of the upper portion 22A commensurate with the maximum tilting allowed by the height of outwardly facing sealing side surface 24 and the compensation space 60. In addition, there may be an optional intermediate member (e.g. a resilient member) 62 to disposed at the upper side of the compensation space and the lower side of the gap 64 to seal the top end of the compensation space 60. Insert 22 may also optionally comprise waste groove 65 to capture melted thermoplastic overflow into the compensating space 60. As further illustrated by way of example in FIG. 2, there may be O-rings 13C, 13D to protect the substrate 11 during compression of the mold members.

In an alternative embodiment, the upper portion 22A and bottom portion 22B of insert 22 are of the same width but the recess 20 comprises a narrower bottom sealing section and a wider top portion to accommodate tilting everywhere along the height of the insert 22.

The pressure actuators 30 are configured to allow tilting of the insert 22. In one embodiment, the pressure actuators 30 include hydraulic actuators which are mechanically coupled to the insert 22 to provide differentially applied pressures onto different portions of the substrate 11. In the case of hydraulic actuators, the pressure-generating system would be a hydraulic power system that includes a hydraulic reservoir, a prime mover (e.g. motor, engine, etc.), hydraulic ram driven by the prime mover and a delivery manifold to supply the hydraulic fluid into the actuators. Thus, with reference to the example of FIG. 2, the pressure actuators 30 comprise a cylinder 40 that houses a pressure coupling member, in this case piston clamp disk 70, an oil reservoir 72 for exerting pressure on the piston clamp disk and a piston oil inlet 74. When the mold is closed in insert 22 positioning/pressure applying mode, the piston clamp disk 70 of each actuators 30 is in contact with the top of insert 22 preferably without mechanical attachments (if mechanical attachments are present they are configured to allow tilting). Cylinder 40 is configured to provide a space between the top of insert 22 and the underside of cylinder 40 to allow tilting of the insert. Also shown in FIG. 2 is a retaining bolt 82 which retains the insert 22 in the recess 20 when the mold is open. The retaining bolt 82 is also configured to allow tilting of the insert. In this example, the bolt receiving space in the insert 22 is sufficiently larger than the bolt itself such as to allow tilting of the insert without hindrance from the retaining bolt 82.

Figure 3:
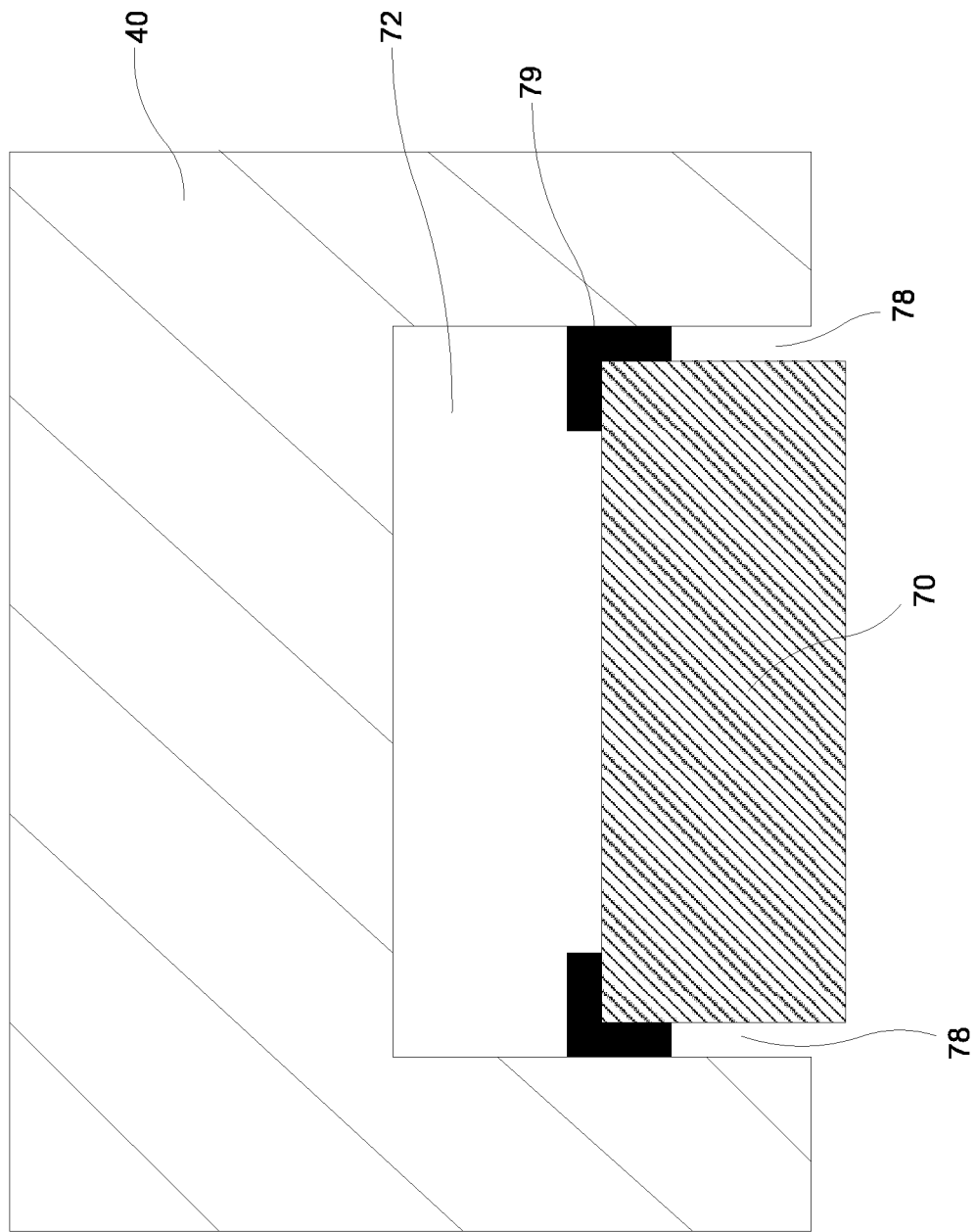
FIG. 3 is a cross-sectional view of the cylinder and piston of one of the pressure-exerting actuators of FIG. 2.

FIG. 3 illustrates in more detail an embodiment of the hydraulic actuators. The cylinder 40 is configured to house the piston clamp disk 70 while providing a gap 78 between the piston clamp disk 70 and the inside wall of cylinder 40. This gap plays a role similar to the compensation space 60 in that it allows the piston clamp disk 70 to tilt within the cylinder in response to (and to allow) tilting of insert 22. It will be appreciated that when the hydraulic pressure system is activated, the piston clamp disk 70 is displaced downwardly such that at least a part of the piston clamp disk protrudes outside cylinder 40 thereby creating the space between the top of insert 22 and the underside of cylinder 40. The piston clamp disk 70 may optionally comprise a seal 79 attached thereto to prevent the oil from the oil reservoir 72 from leaking through gap 78.

The combination of the tiltability of the insert and the hydraulic pressure actuators creates a dynamic positioning of the insert and pressure adjustment prior to injection of the thermoplastic material that can be likened to a "floating" action of the insert in response to thickness variations. It will be appreciated that the pressure on the insert may be generated by pressure actuators other than hydraulic actuators as long as they are coupled to the insert in a manner that allows tilting of the insert.

In a specific implementation for encapsulating a glass of a vehicle such as a quarter window (automobile side glass of about 10 to 20 square inch) or windshield for an automobile, good results may be obtained using a height of the outwardly facing sealing surface 24 between about 3/8 and 1/2 inch and a compensation space 60 between 0.0005 and 0.0015 inch (preferably approximately 0.001 inch). The size of the local thickness variations in the substrate that are accommodated by a mold having these exemplary dimensions is about 0.02 inch or less. The space above the insert 22 (i.e. the "head space") can be greater than 1 inch in this exemplary implementation. The pressure applied in this implementation would be typically between 100 and 2000 psi. It will be understood that these specific numerical ranges are for one example only. Other ranges and dimensions would be possible for other implementations and applications.

Figure 4:
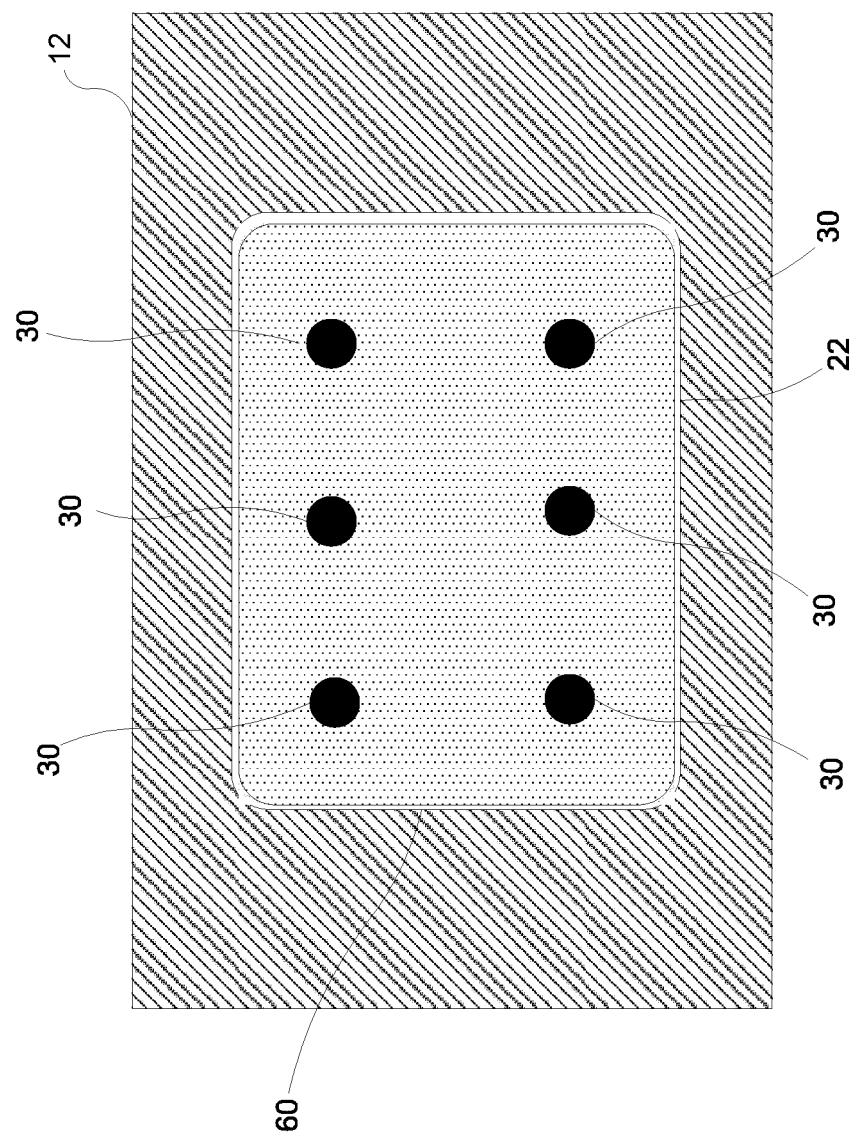
FIG. 4 is a cross-sectional view through a horizontal plane of the insert and pressure-exerting actuators in accordance with another embodiment of the invention.

In one embodiment, several pressure-exerting actuators 30 are distributed across the upper surface of the insert 22 as shown in the example configuration depicted in FIG. 4. The pressure-exerting actuators 30 may be equally spaced-apart (in a symmetrical pattern) as shown in the cross-sectional top view of FIG. 4 or unequally spaced-apart (in an asymmetrical arrangement). The pressure-exerting actuators 30 are driven by a pressure-generating system 50.

The number, the size and disposition of the pressure-exerting actuators 30 is dictated in most embodiments by several factors, including but not limited to the size and shape of the substrate 11, the pressure required in order to properly seal the encapsulation mold and avoid defects such as flash, the size and thickness of the insert 22, the geometry of the encapsulation mold cavity 17, the support 13 and of the substrate contact surface of insert 22. In this respect, and as illustrated by way of example in FIG. 2, the insert 22 may be shaped to contact a contour portion of the substrate 13. The substrate support 13 may contact the entire substrate (except in the encapsulation cavity) or it may be shaped to support the substrate 11 along, for example, a contour portion of the substrate 11 to overlap at least in part the corresponding substrate contact surface of insert 22, leaving spaces 13A and 13B above and below central portions of the substrate 11. Once the desired total pressure and its distribution over the substrate 11 is known, the physical parameters of the mold can be optimized.

The proportion of the surface of substrate 11 that is in contact with the insert 22 depends on the shape of the substrate, shape and extent of encapsulation, required pressure and the like. In a typical embodiment in which a vehicle window such as a quarter window or a windshield is encapsulated this contact surface may be between about 10 and 30 mm wide along a contour of substrate 13. It will be understood that the contact surface is design to provide sufficient pressure for proper sealing while avoiding unnecessary pressure elsewhere on the substrate. Therefore, in most embodiments, a substantial portion of the substrate is not in contact with the insert 22. Alternatively, the insert 22 may contact a predetermined portion of the surface of the substrate 11 in a discontinuous manner, e.g. with discrete sections contacting the substrate at multiple points of contact. Any suitable insert-substrate interface may be provided as long as an adequate seal is formed around the encapsulation mold cavity 17 and that the pressure on the substrate 11 can be distributed substantially equally over the contact surface between insert 22 and substrate 11 by independently controlling each of the plurality of pressure-exerting actuators 30 so as to allow tilting of the insert (or inserts) during its positioning and prior to injection, so as to avoid damaging the substrate. The insert 22 may be made of a different material than the first and second mold members 10, 12, e.g. a softer and/or more elastic material. The insert 22 may be coated with a coating to minimize damage or scratching of the substrate 11 during contact.

In some embodiments the contact surface between any one of the pressure-exerting actuators 30 and insert 22 can be modified (increased or reduced) to, for example, provide additional resistance to upward pressure. As, for example, in cases where the substrate 11 may be subjected to localized upward pressure when the design of the encapsulation mold cavity 17 is asymmetric (as in FIG. 2). In such a case, a differential pressure (causing a net upward force) is created by the injection of the thermoplastic or other flowable molten material. In such a case, positioning and/or increasing the surface of a pressure-exerting actuator 30 in contact with the insert 22 substantially directly above the source of the upward pressure can prevent upward displacement of the insert 22 in that region and thereby prevent the creation of flash.

Figure 5:
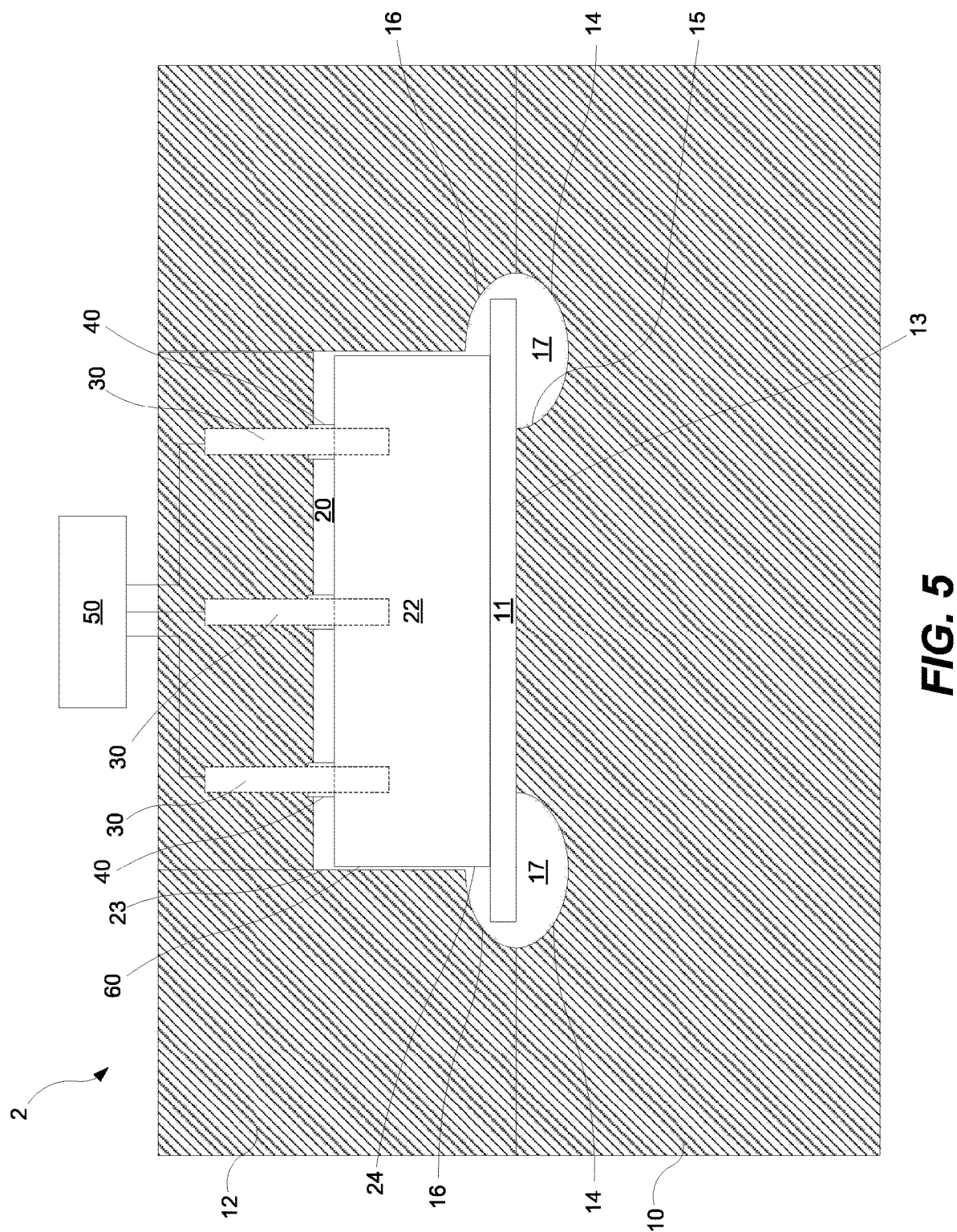
FIG. 5 is a cross-sectional view of an injection mold in accordance with another embodiment of the invention showing the insert coupled via the pressure-exerting actuators to the second mold member (upper mold component).
Figure 7:
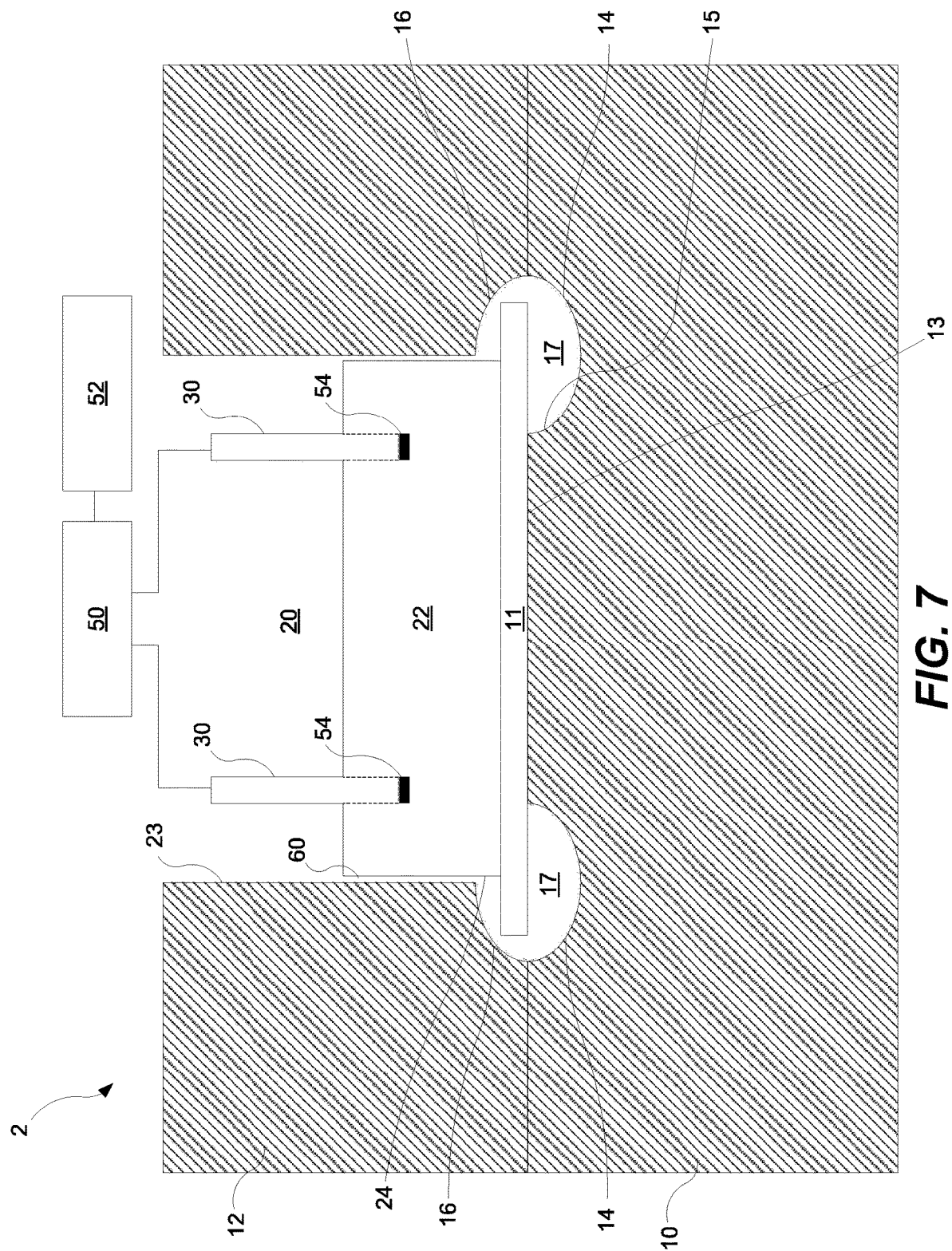
FIG. 7 is a cross-sectional view of an injection mold in accordance with another embodiment of the invention showing pressure sensors connected to the pressure-exerting actuators.
Figure 8:
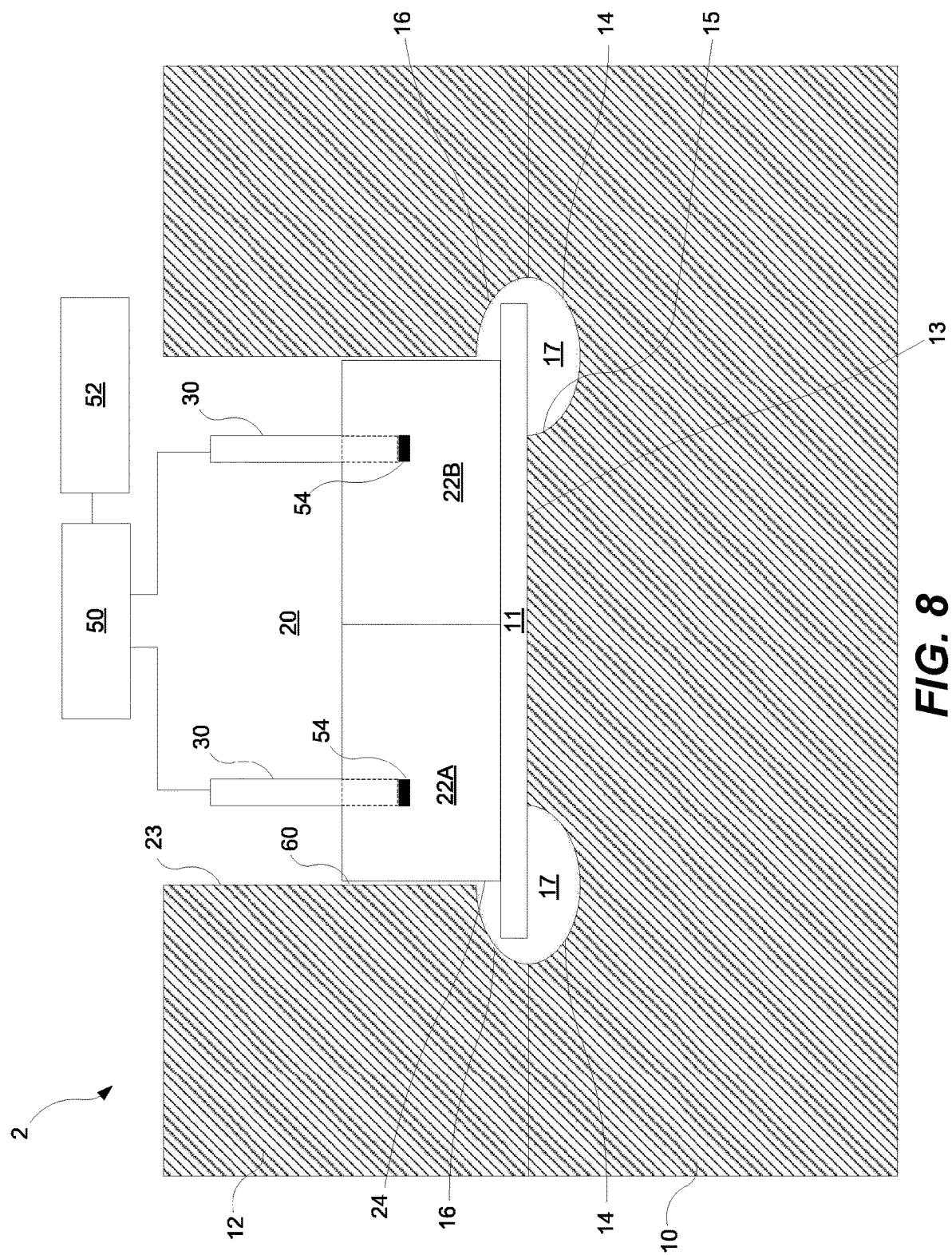
FIG. 8 is a cross-sectional view of an injection mold in accordance with another embodiment of the invention in which the insert is formed of two discrete halves.
Figure 9:
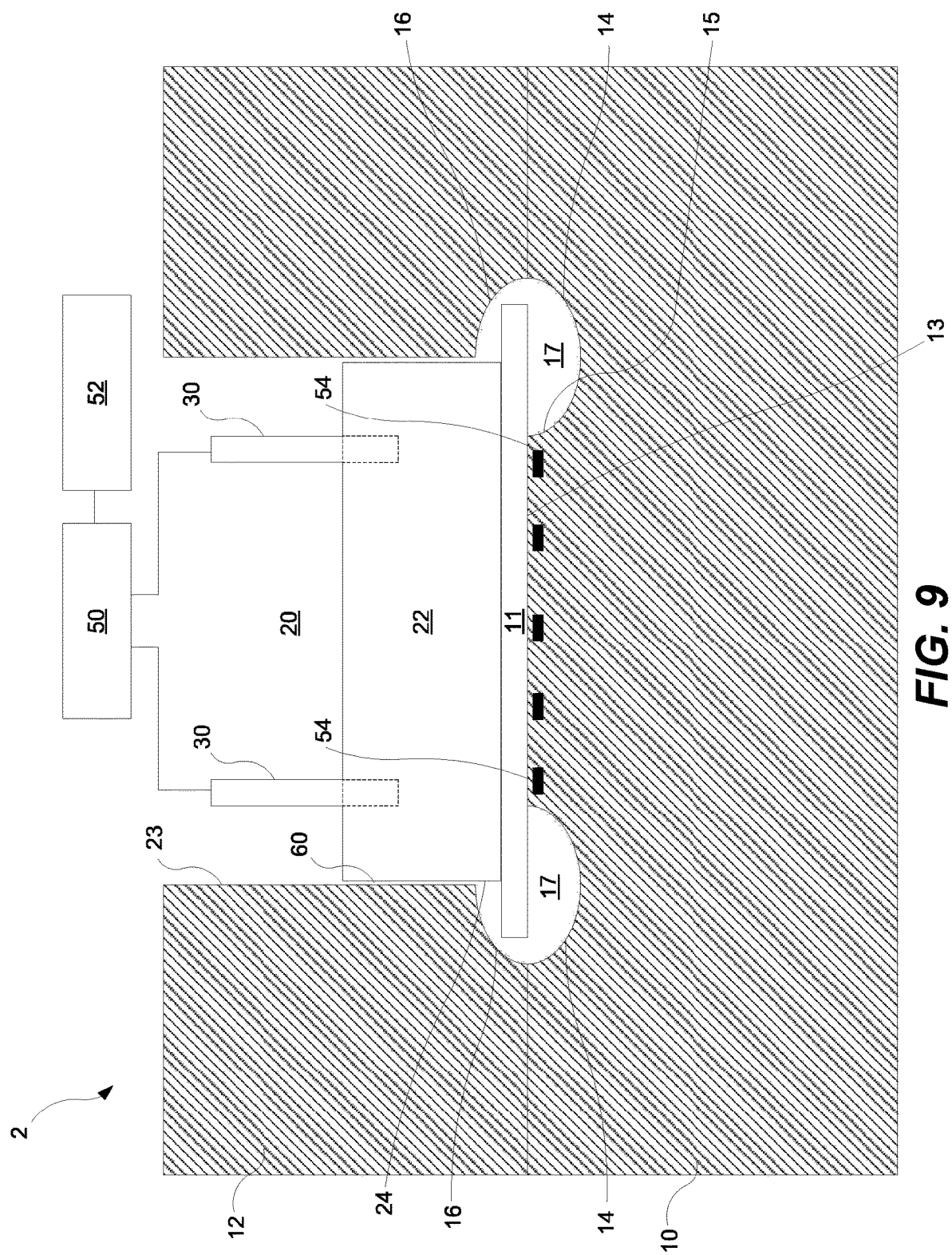
FIG. 9 is a cross-sectional view of an injection mold in accordance with another embodiment of the invention showing pressure sensors in the lower mold component.

The second mold member 12 may extend over the insert 22 to provide structural and functional support for the insert 22 and the pressure-exerting actuators 30. The insert 22 may thus be connected to the second mold member 12 to provide controllable displacement within the recess 20 and the pressure-exerting actuators 30 coupled to the pressure-generating system 50 as shown in FIG. 5. Thus, the pressure-exerting actuators 30 may be partly embedded within the second mold member 12. Actuator cylinder 40 are attached to the second mold member 12 and include a bore sized and shaped to enable sliding movement of the pressure-exerting actuators 30 thereby providing additional structural support. The actuator cylinder 40 preferably provide a space between their bottom ends and the upper surface of the insert 22 to allow tilting of the insert 22 (as shown in FIG. 2 and as explained above). Alternatively, the actuator cylinder 40 may be flexible, articulated or jointed in the region between the upper structure of the upper mold component and the insert 22 to allow for tilting of the insert. The pressure-exerting actuators 30 may be configured to remain leveled while still allowing tilting of the insert 22. Other structural support members or mechanisms such as universal joints, ball joints or the like may be present to enable tilting.

With respect to FIG. 6A, which schematically represents an embodiment of the injection molding encapsulation system of the invention, the pressure-exerting actuators 30 and the pressure-generating system 50 are coupled to a pressure control system 52 (or pressure controller) which is adapted and configured to automatically (e.g. programmatically and without direct user input) adjust the pressure applied by the insert 22 and therefore automatically adjust the position of the insert 22 within the recess 20 as a function of the thickness of the substrate 11 to achieve a predetermined total pressure on the surface of the substrate 11 that is in contact with the insert 22.

In one embodiment, the pressure applied by the pressure-exerting actuators 30 on the insert 22 to generate a pressure on the substrate 11 is controlled in such a way as to allow automatic and dynamic adjustment of the spatial distribution of the predetermined total pressure as a function of the substrate thickness. This automatic and dynamic pressure adjustment coupled with the tiltable characteristics of the insert 22 provides an automatic and dynamic adjustment to thickness variations or defects in the substrate while still providing for an encapsulation that meets the required specifications. In one embodiment, the pressure is automatically and dynamically distributed substantially evenly across the surface of the substrate 11 and prior to injection while providing an encapsulation seal that is compatible with the required specifications (flash minimization for example).

In one embodiment, the pressure-generating system 50 is a self-regulating system such as a hydraulic system. Thus, the pressure controller 52 communicates the parameters required to achieve a desired total pressure on the substrate 11 which is translated into a given pressure of the hydraulic fluid which, in turn, applies a pressure on the pressure-exerting actuators 30 to generate the necessary force on the insert 22 to achieve the desired pressure on the substrate 11. The hydraulic pressure-generating system allows the automatic and dynamic equilibration of the force among the pressure-exerting actuators 30 as a result of variations in the thickness of the substrate 11. Therefore, the total pressure applied to the substrate's surface is automatically distributed substantially equally over the entire contact surface between the insert 22 and the substrate 11 until the desired final pressure is reached. The pressure controller 52 may be a microprocessor or microcontroller. The pressure controller 52 may be implemented in hardware, software, firmware or any suitable combination thereof. The pressure controller 52 may be implemented as an integrated circuit or a computer. Where implemented as software, the control algorithm may be programmed or coded as computer-readable instructions and recorded electronically, magnetically or optically on a fixed or non-transitory computer-readable medium, computer-readable memory, machine-readable memory or computer program product. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc. The pressure controller 52 may be configured or programmed to operate autonomously, semi-autonomously or in response to user commands, or any combination thereof.

In another embodiment the pressure-generating system 50 may comprise individual mechanical components to generate a force on each pressure-exerting actuator 30 that can be controlled independently by the pressure controller 52. For example, the force may be communicated to the pressure actuators by resilient members such as springs or by an electromagnetic force generator, for example. In this case, each of the pressure-exerting actuators 30 is preferably controlled by a pressure feedback mechanism in response to variations from expected pressure readings such that the force or pressure exerted by the pressure-exerting actuators 30 is dynamically adjusted to effect the necessary tilting of the insert 22 in response to thickness variations in the substrate 13. To that effect, the injection mold 2 may include pressure sensors 54 (e.g. strain gauges, piezoelectric sensors or any other suitable type of force transducers) to provide pressure feedback signals to the pressure controller 52. In one specific implementation, the pressure sensors 54 are positioned within the mold 56 to provide pressure readings as the insert 22 is lowered to apply pressure on the substrate 11 as depicted in FIG. 6B.

Once the predetermined pressure is reached, a locking mechanism is activated to hold the insert 22 in position. The locking mechanism may include but is not limited to a hydraulic clamping system (hydraulic clamp disks), squeeze bushings and the like. In the case where the pressure-generating system is a hydraulic system, the pressure can simply be maintained by the hydraulic system without the need for mechanical locking mechanisms.

The pressure required on the substrate 11 to achieve a proper seal and encapsulation will vary depending on the nature of the substrate 11 and the type of injection material used. In typical cases, this pressure will be in the range of 100-2000 psi. Once the minimum required pressure for a particular encapsulation project is determined, the surface of the substrate 11 contacted by the insert 22 and the number and surface of pressure-exerting actuators 30 can be, in turn, determined since the total pressure ultimately applied on the substrate 11 depends on these variables (e.g. the number of pressure-exerting actuators 30, the force applied by each actuator 30, and the surface area of the insert 22).

It will be appreciated that the insert 22 may comprise more pressure-exerting actuators 30 than necessary for a particular application in which case the pressure control system 52 is adapted to selectively activate only the pressure-exerting actuators 30 necessary to reach the final desired pressure. Such an arrangement provides flexibility to adjust the pressure applied to the substrate 11 depending on the size and nature of the substrate 11.

The components of the injection mold are preferably made of metal such as a metal alloy; however, it will be appreciated that other suitable materials may be used for certain components. For example, the first mold member 10 may comprise a rubber or rubber-like cushion 13D around or near the substrate support 13 to help with the initial positioning of the substrate 11 and avoid scratching the substrate, which is particularly useful when the substrate is glass. For positioning the substrate 11, an active mechanism such as one or more suction cups can also be integrated into the first mold member 10.

In one aspect of the invention, a plurality of first mold members 10 having different internal shapes or contours may be used in a production line using the same second mold member 12.

In another embodiment, there is provided insert position detectors to provide information on movement/position of insert 22. Deviations from predetermine ranges can be used as indication of substrate break and can allow termination of the injection process.

In another embodiment of the invention, there is provided a method for substrate encapsulation comprising positioning the substrate (e.g. glass panel) on a support within an injection mold, closing the mold to form an encapsulation mold cavity around an edge of the substrate, applying a predetermined total pressure on the substrate with the insert to seal the encapsulation mold cavity and to prevent displacement of the substrate during injection. The pressure applied by the insert on the substrate while the insert is being positioned on the substrate is automatically adjusted as a function of the thickness of the substrate to distribute the predetermined total pressure substantially evenly across the surface of the substrate in contact with the insert.

In an aspect of the method, the substrate 11 is positioned on the fixed substrate support 13 in the first, lower mold component 10 then the upper, second mold component 12 comprising the tiltable insert 22 is lowered onto first mold component 10 and substrate 11. As the insert is lowered onto the substrate, the force or pressure exerted by individual pressure-exerting actuators 30 is dynamically modulated (controlled) in response to defects or variations of thickness in the substrate 11 thereby enabling an auto-adjustment of the horizontal inclination (tilting) of the insert 22 to generate a substantially equal pressure across the surface of the substrate 11 in the presence of one or more defects in the substrate 11.

Once the predetermined total pressure is reached, the pressure applied by each of the pressure-exerting actuators 30 is maintained and the encapsulation material is injected as a molten flowable plastic material and, after a suitable period of time, the substrate 11 is released.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

What is claimed is:

1. An injection mold for encapsulating a substrate, the injection mold comprising:
   a lower mold component;
   an upper mold component adapted to form an encapsulation mold cavity at an edge of the substrate when the upper mold component engages the lower mold component, wherein the lower mold component comprises a substrate support and wherein the upper mold component comprises a recess;
   a tiltable insert sized and shaped to slide within the recess and having a substrate-contacting surface defining an area of the substrate contacted by the insert, the insert adapted to tilt within the recess relative to the upper and lower mold components to tiltably cooperate with the upper mold component to form a seal for the encapsulation mold cavity; and
   a plurality of pressure-exerting actuators each comprising a pressure coupling member to contact the insert and each actuator being configured to independently apply pressure on the substrate via the insert, wherein the plurality of pressure-exerting actuators are adapted to equilibrate a total predetermined pressure exerted by the insert substantially evenly across the area of the substrate-contacting surface in response to local variations in thickness of the substrate thereby providing a tilting positional adjustment of the insert to compensate said variations.

2. The injection mold of claim 1, wherein the insert comprises a lower portion having a side surface defining a compensation space with a recess wall, said surface having a height such that its top edge is displaced by a lateral distance equal to or less than the compensation space when the insert is tilted.

3. The injection mold of claim 2, wherein the insert further comprises an upper portion, said upper portion having a width smaller than said lower portion.

4. The injection mold of claim 1, wherein the pressure coupling member is tiltable in response to tilting of the insert.

5. The injection mold of claim 1, wherein the insert further comprises an upper portion, said upper portion having a width smaller than said lower portion.

6. The injection mold of claim 1, wherein the pressure-exerting actuators are configured to be flexibly coupled to the tiltable insert to retain their functionality when the tiltable insert is tilted.

7. The injection mold of claim 1, wherein the injection mold further comprises a lock mechanism for locking the pressure-exerting actuators when the predetermined total pressure is reached.

8. The injection mold of claim 1, wherein the substrate is a glass panel.

9. The injection mold of claim 1, wherein the plurality of pressure-exerting actuators are coupled to a pressure-generating system adapted to automatically and dynamically adjust a pressure exerted by each of the pressure-exerting actuators.

10. The injection mold of claim 9, wherein the pressure-generating system comprises a plurality of pressure sensors to measure pressures exerted on the substrate.

11. The injection mold of claim 10, wherein the pressure sensors are connected to the pressure-exerting actuators.

12. The injection mold of claim 10, wherein the pressure sensors are in the lower mold component.

13. A method of encapsulating a substrate comprising:
    positioning the substrate on a support defined by a lower mold component within an injection mold;
    closing the mold by bringing an upper mold component into engagement with the lower mold component to form an encapsulation mold cavity around an edge of the substrate;
    applying a predetermined total pressure on a predetermined area of the substrate with a tiltable insert using a plurality of pressure-exerting actuators to seal the encapsulation mold cavity and prevent displacement of the substrate during injection, wherein the tiltable insert comprises a lower portion having a sealing surface defining a compensation space with a recess wall, said sealing surface having a height such that its top edge is displaced by a lateral distance equal to or less than the compensation space when the insert is tilted, and wherein the pressure-exerting actuators automatically and dynamically adjust the pressure on the substrate via the insert as a function of a thickness of the substrate thereby causing the tiltable insert to tilt slightly relative to the upper and lower mold components in response to local pressure resistance buildup as a result of an imperfection in the substrate until the predetermined total pressure is distributed substantially evenly across the predetermined area;
    injecting an encapsulation material into the encapsulation mold cavity; and releasing the substrate.

14. The method of claim 13, wherein applying the pressure is accomplished by applying pressure via the pressure-exerting actuators to an upper portion of the insert having a width smaller than said lower portion of the insert.

15. The method of claim 13, wherein the plurality of pressure-exerting actuators are controlled by a pressure-generating system adapted to automatically and dynamically adjust a pressure exerted by each of the pressure-exerting actuators.

16. The method of claim 15, wherein the method further comprises measuring pressures exerted on the substrate using a plurality of pressure sensors.

17. The method of claim 16, wherein the pressure sensors are connected to the pressure-exerting actuators.

18. The method of claim 16, wherein the pressure sensors are in the lower mold component.

19. The method of claim 13, wherein the method further comprises locking the pressure-exerting actuators when the predetermined total pressure is reached.

20. The method of claim 13, wherein the substrate is a glass panel.

* * * * *